United States Patent
Angot et al.

(10) Patent No.: US 9,958,267 B2
(45) Date of Patent: May 1, 2018

(54) APPARATUS AND METHOD FOR DUAL MODE DEPTH MEASUREMENT

(71) Applicant: INDUSTRIAL TECHNOLOGY RESEARCH INSTITUTE, Hsinchu (TW)

(72) Inventors: Ludovic Angot, Hsinchu (TW); Kun-Lung Tseng, New Taipei (TW); Yi-Heng Chou, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 219 days.

(21) Appl. No.: 14/977,628

(22) Filed: Dec. 21, 2015

(65) Prior Publication Data
US 2017/0178334 A1    Jun. 22, 2017

(51) Int. Cl.
*G01C 3/08* (2006.01)
*G06T 7/571* (2017.01)
*H04N 5/232* (2006.01)

(52) U.S. Cl.
CPC ............ *G01C 3/08* (2013.01); *G06T 7/571* (2017.01); *H04N 5/23245* (2013.01); *G06T 2207/10028* (2013.01); *G06T 2207/10148* (2013.01)

(58) Field of Classification Search
CPC .......... G01C 3/08; G06T 7/006; G06T 7/571; G06T 7/401; G06T 7/41;
(Continued)

(56) References Cited

U.S. PATENT DOCUMENTS 5,878,152 A * 3/1999 Sussman ............ G01B 11/2513
                                                           382/106
5,912,768 A * 6/1999 Sissom ................ G01B 11/026
                                                           359/625
(Continued)

FOREIGN PATENT DOCUMENTS

CN    1263282 A    8/2000
CN    1537225 A    10/2004
(Continued)

OTHER PUBLICATIONS

Nabeel A. Riza et al., "Multi-image acquisition-based distance sensor using agile laser spot beam", 1559-128X/14/255807-08© 2014 Optical Society of America, vol. 53, No. 25 / Applied Optics, pp. 5807-5814, Sep. 1, 2014.

(Continued)

*Primary Examiner* — Jay Patel
*Assistant Examiner* — Marine Matt
(74) *Attorney, Agent, or Firm* — Rabin & Berdo, P.C.

(57) ABSTRACT

An apparatus and a method for dual mode depth measurement are provided. The apparatus is used for measuring a depth information of a specular surface in a depth from defocus (DFD) mode or measuring a depth information of a textured surface in a depth from focus (DFF) mode. The apparatus includes a light source, a controller, a processor, a lighting optical system, an imaging optical system, a beam splitter and a camera. The controller is for switching between the depth from defocus mode and the depth from focus mode. The lighting optical system is used to focus a light from the light source on an object surface in the depth from defocus mode, and the lighting optical system is used to illuminate the object surface with a uniform irradiance in the depth from focus mode.

13 Claims, 7 Drawing Sheets

(58) Field of Classification Search
CPC ........... G06T 2207/10028; G06T 2207/10148;
H04N 5/23245
USPC ........................................................ 348/135
See application file for complete search history.

(56) References Cited

U.S. PATENT DOCUMENTS

| | | | |
|---|---|---|---|
| 5,949,433 A * | 9/1999 | Klotz | G06T 3/40 345/419 |
| 6,025,905 A * | 2/2000 | Sussman | G01N 21/8806 356/3.01 |
| 6,229,913 B1 * | 5/2001 | Nayar | G02B 27/2278 250/201.4 |
| 8,743,263 B2 | 6/2014 | Bianchi et al. | |
| 9,746,315 B1 * | 8/2017 | Schmit | G01B 11/2441 |
| 2003/0053513 A1 * | 3/2003 | Vatan | G02B 26/10 372/109 |
| 2007/0229658 A1 * | 10/2007 | Kanamori | G06T 3/40 348/135 |
| 2008/0123106 A1 * | 5/2008 | Zeng | A61B 5/0066 356/600 |
| 2008/0137059 A1 * | 6/2008 | Piestun | G01C 3/08 356/4.01 |
| 2008/0186390 A1 * | 8/2008 | Sato | G06T 3/4053 348/222.1 |
| 2008/0230611 A1 | 9/2008 | Sprague et al. | |
| 2009/0073419 A1 * | 3/2009 | Gesner | G01B 11/026 356/73 |
| 2009/0128833 A1 * | 5/2009 | Yahav | G01S 17/023 356/623 |
| 2009/0135183 A1 * | 5/2009 | Sato | G01B 11/002 345/426 |
| 2011/0085155 A1 * | 4/2011 | Stann | G01C 3/08 356/5.09 |
| 2011/0222734 A1 | 9/2011 | Angot et al. | |
| 2011/0229840 A1 * | 9/2011 | Liang | A61B 5/1077 433/29 |
| 2012/0076369 A1 * | 3/2012 | Abramovich | G06K 9/00033 382/124 |
| 2012/0140243 A1 * | 6/2012 | Colonna de Lega | A61F 9/00836 356/609 |
| 2013/0081246 A1 * | 4/2013 | Case | B23Q 17/20 29/407.01 |
| 2014/0184748 A1 * | 7/2014 | Gharib | H04N 13/0246 348/46 |
| 2014/0362192 A1 | 12/2014 | Lin et al. | |
| 2017/0053411 A1 * | 2/2017 | Powell | G02B 5/3058 |

FOREIGN PATENT DOCUMENTS

| | | |
|---|---|---|
| CN | 103116739 A | 5/2013 |
| TW | I247887 B | 1/2006 |
| TW | I287614 B | 10/2007 |
| TW | 201003637 A | 1/2010 |
| TW | 201015493 A | 4/2010 |

OTHER PUBLICATIONS

Changhoon Yim et al., "Multiresolution 3-D Range Segmentation Using Focus Cues", IEEE Transactions on Image Processing, vol. 7, No. 9, pp. 1283-1299, Sep. 1998.

Reinhard Danzl et al., "Focus Variation—a Robust Technology for High Resolution Optical 3D Surface Metrology", Strojniški vestnik—Journal of Mechanical Engineering 57(2011)3, pp. 245-256 DOI:10.5545/sv-jme.2010.175, 2011.

Ilya Blayvas et al., "Role of optics in the accuracy of depth-from-defocus systems", 1084-7529/07/040967-6, vol. 24, No. 4/ Apr. 2007/J. Opt. Soc. Am. A, pp. 967-972, 2007.

Masahiro Watanabe et al., "Real-time computation of depth from defocus", 14 ISPIE vol. 2599 O-8194-1963-X/96, pp. 1-12.

"Laser Beam Expanders Basics and Applications", pp. 1-6.

* cited by examiner

APPARATUS AND METHOD FOR DUAL MODE DEPTH MEASUREMENT

TECHNICAL FIELD

The disclosure relates in general to an apparatus and a method for small scale depth measurements.

BACKGROUND

In the field of Automatic Optical Inspection (AOI), depth and distance measurements occupy an important position. Some technologies, such as chromatic confocal spectroscopy, white light interferometry, conoscopic holography, triangulation, depth from focus (DFF) and depth from defocus (DFD) can perform such measurements.

Depth from defocus consists in obtaining depth information from the analysis of the amount of defocus within one or more captured images. Active depth from defocus can be seen as an extension of depth from defocus, and consists in focusing a light beam into a spot onto the surface of the object to be inspected and deduce depth information from the size of the spot of light. The depth precision and measuring range depends on the type of light source (LED, laser, etc.) and the characteristics of the optics used to collimate and focus the light beam. Once the focusing lens is chosen, the measuring range and precision are fixed. Such approach is inadequate for inspecting parts requiring different measuring range and depth precision.

In depth from focus, in-focus Regions Of Interest (ROI) are extracted from images of an object taken at different focus distances in order to obtain a stack of 2D slices, these slices are then used to reconstruct a 3D model of the object. Here, the resolution and accuracy of the measurement system depend on the depth of field of the optical system.

Active depth from defocus is adequate for material presenting proper reflectivity and little diffusion (scattering) while depth from focus requires the surface of the object to be inspected to present sufficient texture so that in-focused ROI can be reliably extracted. One system doesn't allow for inspecting both types of material. There is therefore a need for a depth probe incorporating a mean to change the measuring range, and for a depth probe allowing characterizing textured surfaces as well as surfaces offering a specular reflection.

SUMMARY

The disclosure is directed to an apparatus and a method for measuring depth from a lens or any fixed reference point to a surface, and for measuring relative depth on surfaces presenting a structure with a texture, as well as surfaces with no texture. In particular, this disclosure is directed to an apparatus and a method for dual mode depth measurement where a depth from defocus mode or a depth from focus mode can be used.

According to a first aspect of the present disclosure, an apparatus for dual mode depth measurement is provided. The apparatus is used for measuring a depth information of an object presenting a specular surface in a depth from defocus (DFD) mode or measuring a depth information of an object presenting a textured surface in a depth from focus (DFF) mode. The apparatus includes a light source, a controller, a processor, a lighting optical system, an imaging optical system, a beam splitter and a camera. The controller is for switching between the depth from defocus mode and the depth from focus mode. The processor is for processing a plurality of images and performing a plurality of computations. The lighting optical system is for illuminating the surface of the object. In the depth from defocus mode, the lighting optical system focuses a light from the light source into a light spot, and in the depth from focus mode, it transforms a light from the light source into a uniform light beam.

According to a second aspect of the present disclosure, a method for dual mode depth measurement is provided. The method is used for measuring a depth information of an object presenting a specular surface using a depth from defocus (DFD) mode or measuring a depth information of an object presenting a textured surface using a depth from focus (DFF) mode. The method includes the following steps. An object is illuminated with a coherent light, such as a laser. An amount of speckle reflected from the object is analyzed, the amount and nature of speckle determines whether the object has a specular surface or a textured surface. If the object presents a specular surface, depth information is obtained using the depth from defocus mode. If the object presents a textured surface, depth information is obtained using the depth from focus mode.

The above and other aspects of the disclosure will become better understood with regard to the following detailed description of the non-limiting embodiments. The following description is made with reference to the accompanying drawings.

DETAILED DESCRIPTION

Figure 1:
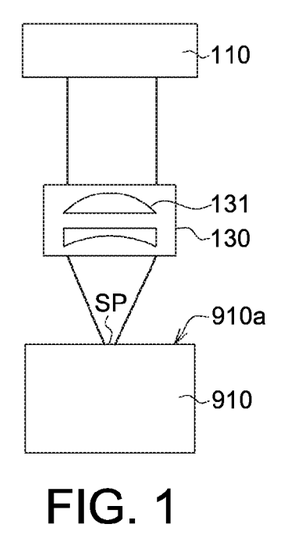
FIG. 1 shows a light source and a lighting optical system operating in a depth from defocus (DFD) mode.
Figure 2:
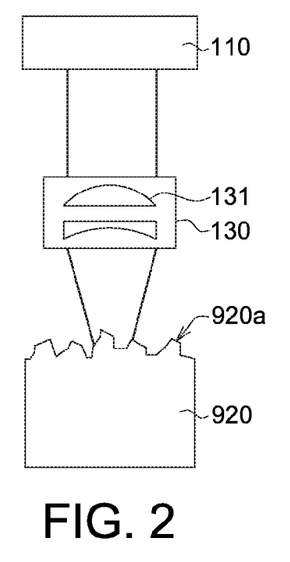
FIG. 2 shows the light source and the lighting optical system operating in a depth from focus (DFF) mode.

This disclosure relates to an apparatus and a method for dual mode depth measurement. A user can perform depth measurements on objects having a surface presenting specular reflection or objects having textured surfaces, and the user can adjust the desired depth measurement precision and the working range. The apparatus and the method for dual mode depth measurement can be used to obtain relative distances to inspect parts with high precision. FIG. 1 and FIG. 2 illustrate the modes in which lighting operates to illuminate the surface of an object. FIG. 1 shows a light source 110 and a lighting optical system 130 operating in a depth from defocus (DFD) mode. In FIG. 1, an object 910, such as a HDD platter disk or a wafer, has a surface 910*a* on which reflection is specular, said surface 910*a* will thereafter be referred to as a specular surface. The lighting optical system 130 focuses light from the light source 110 in FIG.

1 into a narrow light spot SP on the specular surface 910a. FIG. 2 shows the light source 110 and the lighting optical system 130 operating in the depth from focus (DFF) mode. In FIG. 2, an object 920 has a textured surface 920a. Any light projected on the textured surface 920a will create a significant scattering of the light, which would seriously impair the depth from defocus approach. Therefore, depth measurement of the textured surface 920a should be operated in the depth from focus mode, instead of the depth from defocus mode. The beam of light emitted by the light source 110 in FIG. 2 is transformed into a uniform light beam by the lighting optical system 130. The uniform light beam is used for illuminating the textured surface 920a, such that a plurality of 2D slice images of the textured surface 920a can subsequently be captured under the proper illumination.

Figure 3:
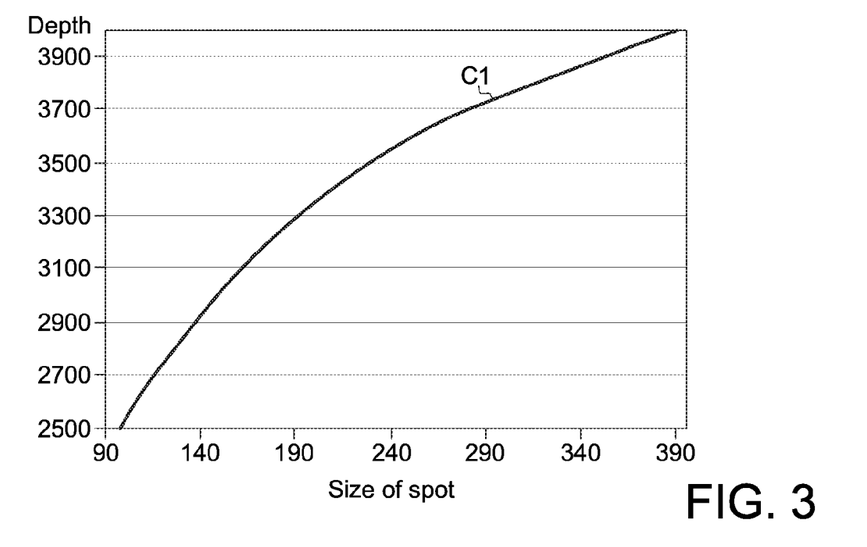
FIG. 3 shows a calibration curve.

FIG. 3 shows a calibration curve C1 used in the depth from defocus mode. The calibration curve C1 shows a relationship between the depth and the size of the light spot SP. The size of the light spot SP depends on the amount of defocus induced by the height profile of the object 920. According to the calibration curve C1, the depth information of the specular surface 910a can be obtained.

The depth from focus mode is based on the principles of capturing images of an object at different height in order to obtain a 3D model of the object, this approach is well known. It includes the steps of finding in-focus regions of interest (ROI) within each 2D slice images, and stitching together the in-focused ROI of the series of 2D slice to reconstruct the 3D surface of the object. In the present embodiment, the 2D slice images in the depth from focus mode can be captured by changing the focus distance of an imaging optical system, such as the imaging optical system 160 in FIG. 4. Selecting region of in-focused pixels within each 2D slice image at the various heights can be done, for example, by performing a sub-pixel edge detection or a high pass filtering operation with the appropriate filter kernel. Other approaches known to those skilled in the art can also be used.

Figure 4:
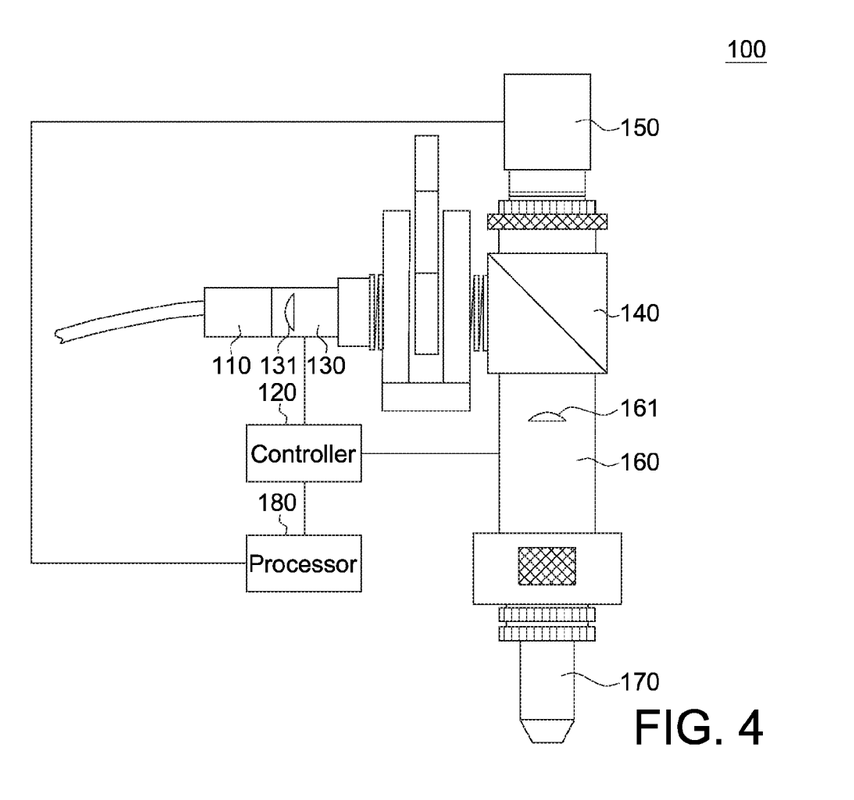
FIG. 4 illustrates an apparatus for dual mode depth measurement.

In FIG. 4, an apparatus 100 for dual mode depth measurement is shown. The apparatus 100 includes a light source 110, a controller 120, a lighting optical system 130, a beam splitter 140, a camera 150, a processor 180, an imaging optical system 160 and a lens module 170. The imaging optical system 160 and the lens module 170 are used to obtain an image of the illuminated surface of the object. The imaging optical system 160, the lens module 170 and the lighting optical system 130 are used to control the light incoming on the surface of the object. The imaging optical system is thus used for both image capture and lighting control. The light incoming on the surface of the object can be focused to a narrow spot or uniform with an area equal or larger than the FOV of the imaging system. The apparatus 100 is used for measuring the depth information of the specular surface 910a in the depth from defocus mode or measuring the depth information of the textured surface 920a in the depth from focus mode. The light source 110 may be an incoherent light source, such as a LED, or a coherent light source, such as a laser. The light source can also be a combination of an incoherent light source and a coherent light source, combined by the use of a beam splitter, with the possibility to switch on or off either or both of the incoherent and coherent light sources.

The controller 120 may be a computer, a processing chip, a circuit, or a storage device storing a plurality of program codes. The controller 120 is used for controlling the lighting optical system 130 and the imaging optical system 160. In this embodiment, the controller 120 is for switching between the depth from defocus mode and the depth from focus mode. The switching will be explained in a next section.

The lighting optical system 130 is used for controlling light from the light source 110. In the depth from defocus mode, light is controlled so that it is focused onto the object surface, and in the depth from focus mode light is controlled so that it produces a uniform light onto the object surface. Light from the light source 110 and the lighting optical system 130 is reflected by the beam splitter 140 toward the object, passing through the imaging optical system 160 and the lens module 170. The beam splitter 140 can be polarizing or insensitive to polarization. The beam splitter 140 can be used together with a quarter wave plate in order to prevent light reflected by the object to be reflected back to the light source 110, which could impair the power control of some lasers containing a photodiode.

The imaging optical system 160, in association with the lens module 170, is for changing the focus distance of the imaging system comprising the camera 150, the imaging optical system 160 and the lens module 170. In depth from focus mode, it is used to obtain 2D slice images of a surface of a textured surface 920a, and in depth from defocus mode it is used to obtain an image of the light beam from the light source 110 focused on an object with a specular surface 910a. In the depth from focus mode, the lighting optical system 130 sets the field of illumination of the uniform light beam to be at least equal to a field of view (FOV) of the imaging system.

Further, the lighting optical system 130 includes an electrically focus tunable lens 131, and the imaging optical system 160 includes an electrically focus tunable lens 161. The controller 120 controls a current or voltage applied to the electrically focus tunable lens 131 to focus light from the light source 110 or to produce a uniform illumination on the surface of the object from the light from the light source 110. The controller 120 controls a current or a voltage applied to electrically focus tunable lens 161 to change the in-focused region of the textured surface 920a.

Figure 5A:
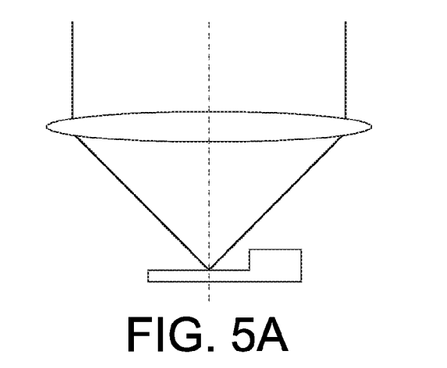
FIGS. 5A to 5C show the focusing of light at different height depending on the nature of the incoming light including collimated, diverging and converging.
Figure 5B:
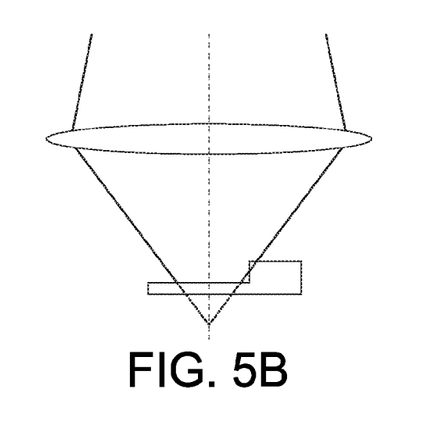
Figure 5C:
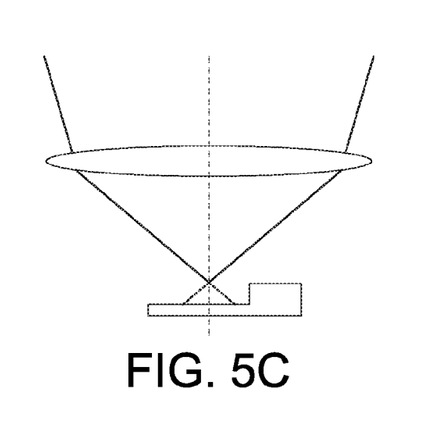

The collimation, divergence or convergence of the light of the light source 110 incoming on the lens module 170 is controlled by the lighting optical system 130 and imaging optical system 160 and dictates the location and type of illumination, as seen on FIGS. 5A to 5C. As shown in FIG. 5A, if the light beam incoming on the lens module 170 is collimated, light is focused at a distance equal to the focal length of the focusing lens. As shown in FIG. 5B, if the incoming beam is divergent, a wide field of illumination can be obtained. As shown in FIG. 5C, if the light is convergent, the focus can be done at a distance shorter than the focal lens of the focusing lens.

Figure 6:
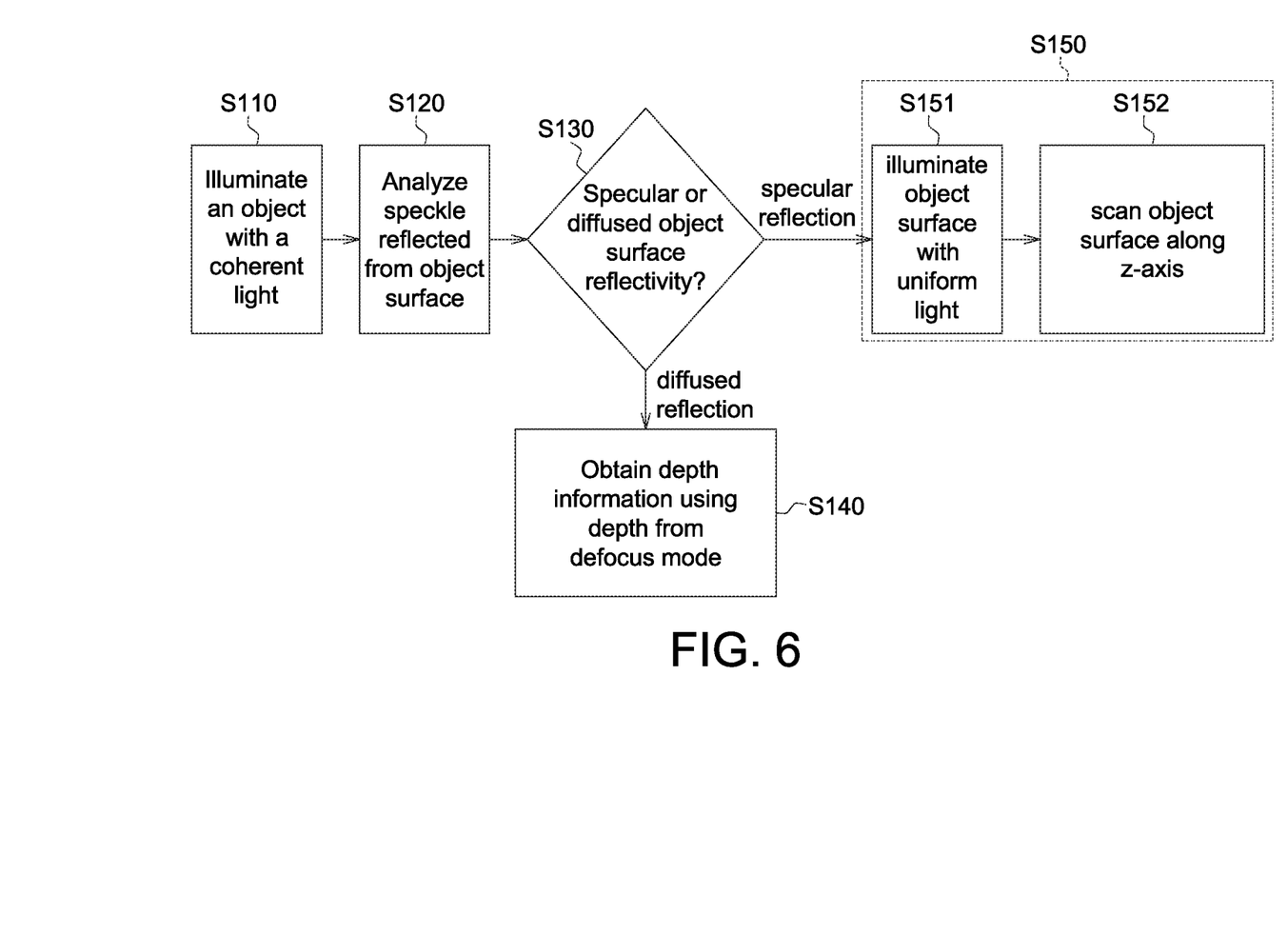
FIG. 6 illustrates a flowchart of a method for dual mode depth measurement.

Image capture is described by referring back to FIG. 4. Light reflected by the surface of the inspected object is imaged through the lens module 170 and the imaging optical system 160 and passes through the beam splitter 140, and is captured by the camera 150. FIG. 6 illustrates a flowchart of the method for dual mode depth measurement. The method is used for measuring the depth information of the specular surface 910a in the depth from defocus mode or measuring the depth information of the textured surface 920a in the depth from focus mode. At step S110, the object, such as the object 910 in FIG. 1 or the object 920 in FIG. 2, is illuminated with a coherent light, such that the light focuses on the surface of the object with a dimension smaller than the imaging system's FOV. The coherent light in step S110 can be provided from the light source 110.

Figure 7A:
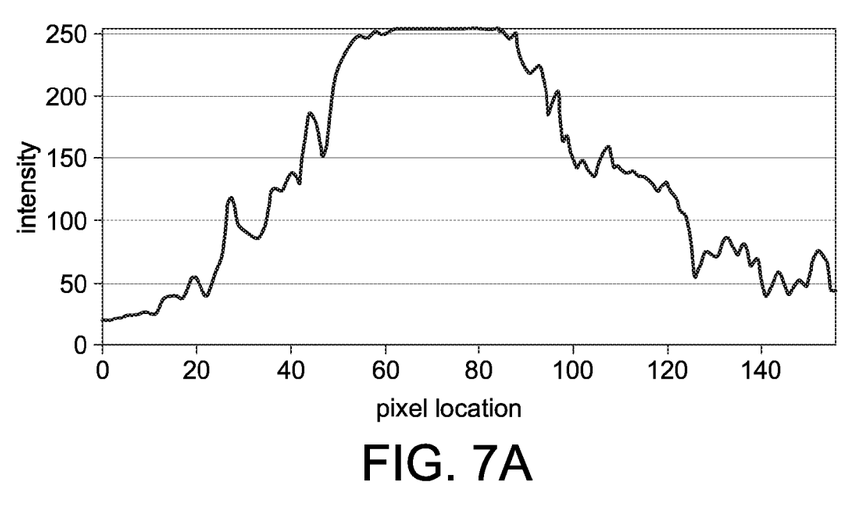
FIGS. 7A and 7B show two intensity curves used for evaluating an amount of speckle in the light reflected by a surface to inspect.
Figure 7B:
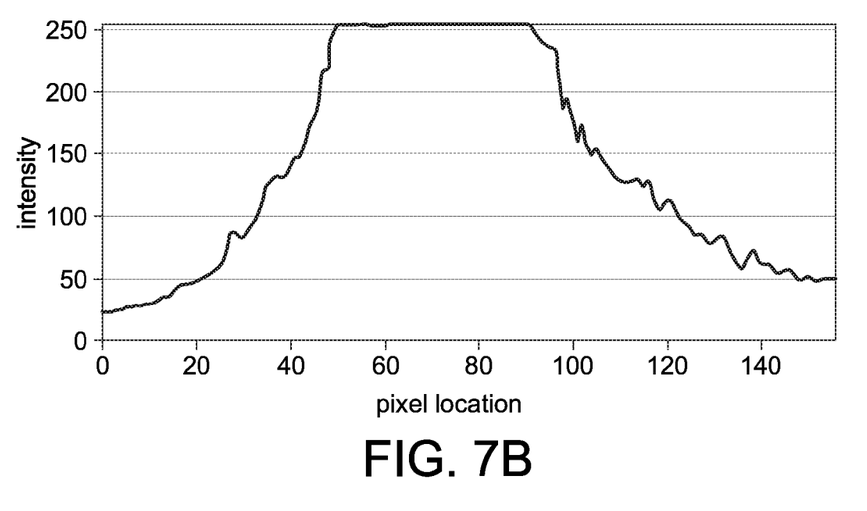

In step S120, an amount of speckle reflected from the object, such as the object 910 or the object 920 in FIGS. 1 and 2, is analyzed. FIGS. 7A and 7B show two intensity curves, corresponding to the light intensity profile as seen along a line crossing the center of a light beam focused on the surface of the object. The amount of speckle in FIG. 7A is larger than that in FIG. 7B, as can be deduced from the random nature of the intensity profile in FIG. 7A compared to the smoother intensity profile in FIG. 7B.

In step S130, whether the object presents a specular surface or has a textured surface is determined by the controller 120 according to the amount of speckle contained in the reflected image. If the amount of speckle is smaller than a predetermined value, then it is determined that the object presents a specular surface; if the amount of speckle is larger than a predetermined value, it is determined that the object has a textured surface.

In step S140, the depth information of the specular surface of the object is measured in the depth from defocus mode. That is to say, the controller 120 controls the current or voltage applied to the electrically focus tunable lens 131 so that light from the light source 110 is focused on the surface of the object. As is known to those skilled in the art, the size of the focus spot is directly related to the height variation of the surface of the object. The size of the spot is measured from the image captured by the imaging system by processor 180. Depth information of the specular surface can be obtained from the calibration curve C1 relating the size of the spot to the relative depth as shown on FIG. 3. The depth information can also be obtained by controlling the current applied to the electrically focus tunable lens 131 in order to maintain the size of the focused spot to its smallest size through a feedback loop from the processor 180 and relating the depth to the current applied to the tunable lens through a calibration curve.

In step S150, the depth information of the textured surface of the object is measured in the depth from focus mode. Step S150 includes step S151 and step S152. At step S151, the controller 120 controls the current or voltage applied to the electrically focus tunable lens 131 so that light illuminating the surface of the object is uniform and has a field of illumination at least equal or larger than the field of view of the imaging system. At step S152, the controller 120 controls the current or voltage applied to the electrically focus tunable lens 161 to change the focusing distance and therefore to change the in-focused region of the textured surface 920a. It is noted that the change of the focal length of the electrically focus tunable lens 161 also influences the light incoming on the object from the light source, this is compensated by properly controlling the electrically focus tunable lens 131. Then, several in-focused 2D slice images are captured under the Illumination of the uniform light beam. Processor 180 then extracts in-focused ROI from the in-focused 2D slice images and a 3D structure of the textured surface can be obtained by stacking and merging the in-focused ROI, knowing the amount of defocus at which the 2D slice images were captured.

Figure 8:
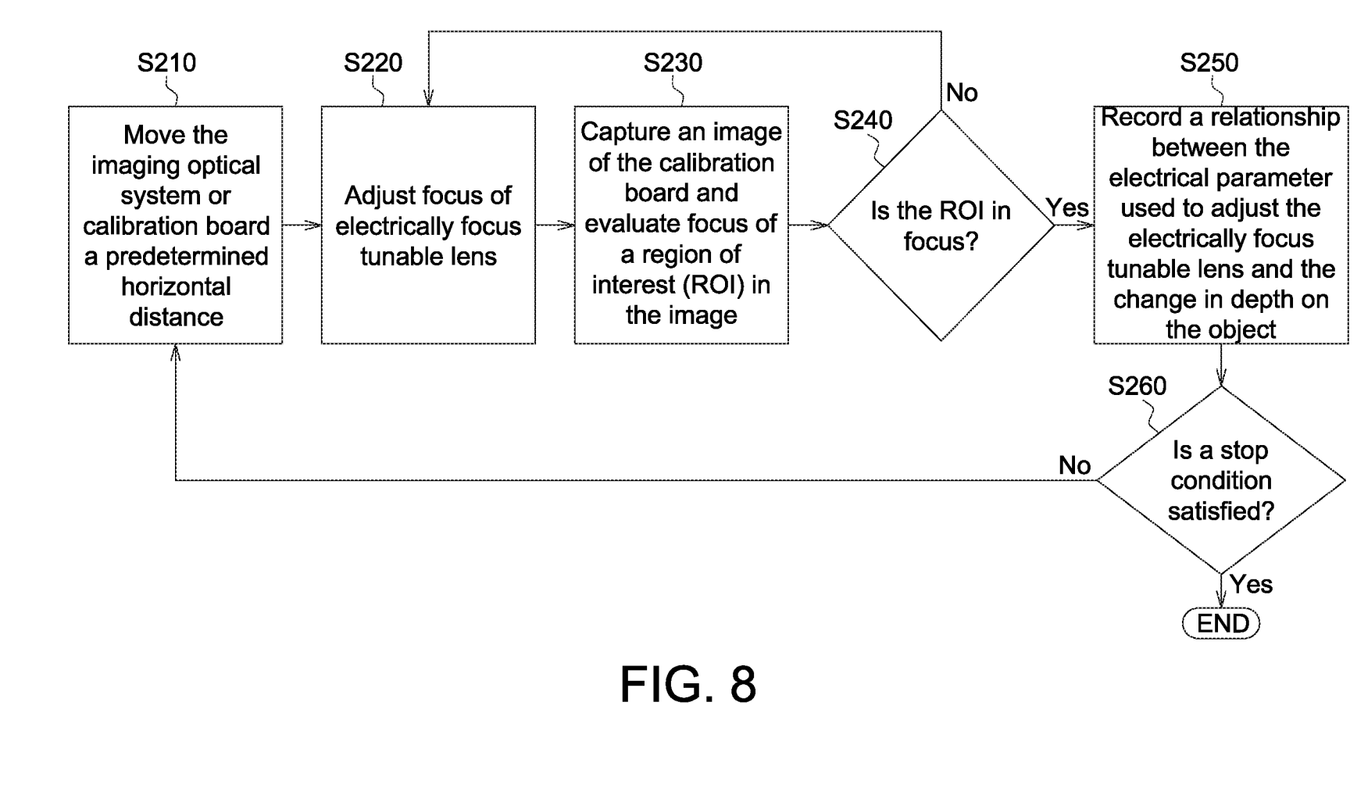
FIG. 8 illustrates a flowchart of a calibration method.
Figure 9:
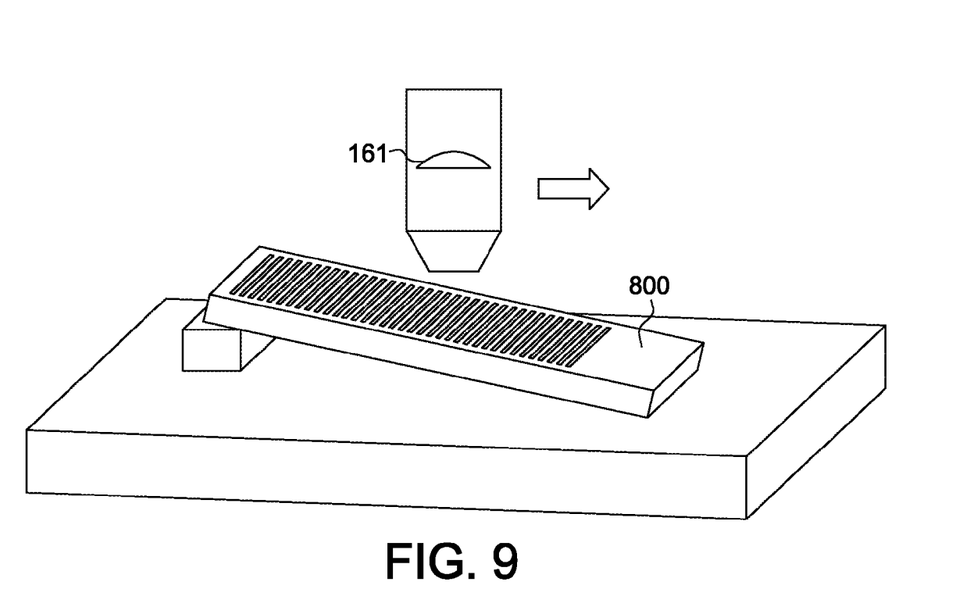
FIG. 9 shows a Ronchi ruling board and an electrically focus tunable lens.

In the present embodiment, the current or voltage applied to the electrically focus tunable lens 161 controls the change of the focus of the imaging system and determines at which height the in-focused region of the textured surface 920a is captured. In order to relate the height at which the imaging lens is focused to the applied current or voltage, a calibration method is required. Referring to FIGS. 8 and 9, FIG. 8 illustrates a flowchart of the calibration method, and FIG. 9 shows a calibration board such as one containing a calibration board 800, such as a Ronchi ruling board, and the electrically focus tunable lens 161. The surface of the calibration board comprises etched or plated lines precisely spaced by a known distance. The calibration board is inclined by a known angle with a step block. At step S210, the electrically focus tunable lens 161 or the calibration board 800 is moved a predetermined horizontal distance, such that the electrically focus tunable lens 161 is aimed at a region of interest containing a line of the calibration board 800.

At step S220, the focus of the electrically focus tunable lens 161 is changed by changing the current or voltage applied to the electrically focus tunable lens 161.

At step S230, an image of the calibration board 800 is captured and the focus of a region of interest in this image is evaluated.

At step S240, whether the aimed line is in focus is determined. If the aimed line is not in the focus location, then the process returns to the step S220; if the aimed line is in the focus, then the process proceeds to step S250.

At step S250, a relationship between the current or voltage applied to the electrically focus tunable lens and a change in vertical depth is recorded. The changed depth can be calculated according to the predetermined horizontal distance and the inclined angle of the calibration board 800.

At step S260, whether a stop condition is satisfied is determined. For example, the stop condition may be that the motion of electrically focus tunable lens 161 or the calibration board 800 reaches a far end or that the current or voltage applied to the electrically focus tunable lens 161 has reached a maximum value or a minimum value. If the stop condition is not satisfied, the process returns to the step S210; otherwise the calibration process is terminated.

According to the embodiments described above, the apparatus and the method allows a dual mode operation where the depth from defocus mode or the depth from focus mode can be chosen.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for dual mode depth measurement, wherein the apparatus is used for measuring depth information of an object presenting a specular surface in a depth from a defocus (DFD) mode or measuring depth information of an object presenting a textured surface in a depth from a focus (DFF) mode, and the apparatus comprises:
   a light source;
   a controller for switching between the depth from the defocus mode and the depth from the focus mode;
   a processor for processing a plurality of images and performing a plurality of computations;
   a lighting optical system used to control a light from the light source, wherein the lighting optical system is used to focus the light from the light source on an object surface in the depth from the defocus mode, the lighting optical system is used to illuminate the object surface with a uniform irradiance in the depth from the focus mode, and the lighting optical system controls a focus distance of the light in the depth from the defocus mode and a focus distance of the light in the depth from the focus mode to be different;
   an imaging optical system, wherein the imaging optical system is used to capture images and also used to further control the light from the light source;
   a beam splitter; and
   a camera.

2. The apparatus for dual mode depth measurement according to claim 1, wherein in the depth from the focus mode, the field of illumination of the uniform irradiance produced by the light source and the lighting optical system is equal to or larger than the field of view (FOV) of an imaging system which comprises the camera, the imaging optical system and a lens module.

3. The apparatus for dual mode depth measurement according to claim 1, wherein the lighting optical system includes a lens element whose focal length is electrically adjustable.

4. The apparatus for dual mode depth measurement according to claim 3, wherein the controller controls an electrical quantity applied to the lens element whose focal length is electrically adjustable in order to assist in producing either a focused spot on the object surface or to illuminate the object surface with a uniform irradiance.

5. The apparatus for dual mode depth measurement according to claim 1, wherein the imaging optical system includes a lens element whose focal length is electrically adjustable.

6. The apparatus for dual mode depth measurement according to claim 5, wherein the controller controls an electrical quantity applied to the lens element whose focal length is electrically adjustable to change the in-focused region of the object surface.

7. The apparatus for dual mode depth measurement according to claim 1, wherein the processor is used for determining whether an object presents a specular surface or a textured surface.

8. The apparatus for dual mode depth measurement according to claim 7, wherein:
the object is illuminated with a coherent light, and the processor analyses an image of the object surface captured by the imaging system to determine whether the object presents a specular surface or a textured surface according to an amount of speckle reflected by the object;
if the amount of speckle is smaller than a predetermined threshold, the object presents a specular surface; and
if the amount of speckle is larger than or equal to the threshold, the object presents a textured surface.

9. A method for dual mode depth measurement, wherein the method is used for measuring depth information of a specular surface in a depth from a defocus mode or measuring depth information of a textured surface in a depth from a focus mode, and the method comprises:
illuminating an object with a coherent light; and
analyzing an image of the object surface captured by an imaging system to determine whether the object presents a specular surface or a textured surface according to an amount of speckle reflected by the object, wherein if the amount of speckle is smaller than a predetermined threshold, the object presents a specular surface, and if the amount of speckle is larger than or equal to the threshold, the object presents a textured surface
measuring the depth information of the specular surface of the object with a depth from a defocus method in the depth from the defocus mode if the object presents a specular surface; and
measuring the depth information of the textured surface of the object with a depth from a focus method in the depth from the focus mode if the object presents a textured surface;
wherein a focus distance of the light in the depth from the defocus mode and a focus distance of the light in the depth from the focus mode are controlled to be different.

10. The method for dual mode depth measurement according to claim 9, wherein in the step of measuring the depth information for the object presenting the specular surface in the depth from the defocus mode, a light from a light source is focused onto the object surface.

11. The method for dual mode depth measurement according to claim 9, wherein in the step of measuring the depth information for the object presenting the textured surface in the depth from the focus mode, a light from a light source illuminates an area of the object with a uniform irradiance.

12. The method for dual mode depth measurement according to claim 11, wherein the illuminated area of the object is equal to or larger than the field of view (FOV) of an imaging system.

13. The apparatus for dual mode depth measurement according to claim 8, wherein the amount of speckle is determined by a variance of a pixel intensity signal in the image of a reflected light from the object along at least one direction.

* * * * *